(12) United States Patent
Suzuki

(10) Patent No.: US 6,371,185 B1
(45) Date of Patent: Apr. 16, 2002

(54) PNEUMATIC TIRES WITH SIDEWALL REINFORCING LAYERS

(75) Inventor: Kazunori Suzuki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/650,653

(22) Filed: Aug. 30, 2000

(30) Foreign Application Priority Data

Sep. 9, 1999 (JP) .......................................... 11-255378

(51) Int. Cl.$^7$ .......................... B60C 13/00; B60C 15/00; B60C 15/06

(52) U.S. Cl. ........................ 152/546; 152/547; 152/554; 152/555

(58) Field of Search ................................ 152/552, 554, 152/555, 546, 541, 547

(56) References Cited

U.S. PATENT DOCUMENTS 6,119,748 A * 9/2000 Kobayashi et al. ..... 152/555 X

* cited by examiner

Primary Examiner—Adrienne C Johnstone
(74) Attorney, Agent, or Firm—Sughrue Mion, PLLC

(57) ABSTRACT

A pneumatic tire comprises a tread portion, a pair of sidewall portions, a pair of bead portions, a carcass, a belt, and a bead filler rubber, wherein the bead filler rubber in an assembly of the tire and an approved rim has a height lower than the height of a rim flange, and a turnup portion of the carcass has a height not less than 0.5 times a section height of the carcass from a rim size line and extends over a maximum width position of the carcass and in parallel to a main body of the carcass outward from a taper end of the bead filler rubber, and a pair of sidewall reinforcing layers are arranged along an outside of the turnup portion to extend from near to the taper end of the bead filler rubber up to at least near to an end of the belt.

5 Claims, 3 Drawing Sheets

COMPARATIVE

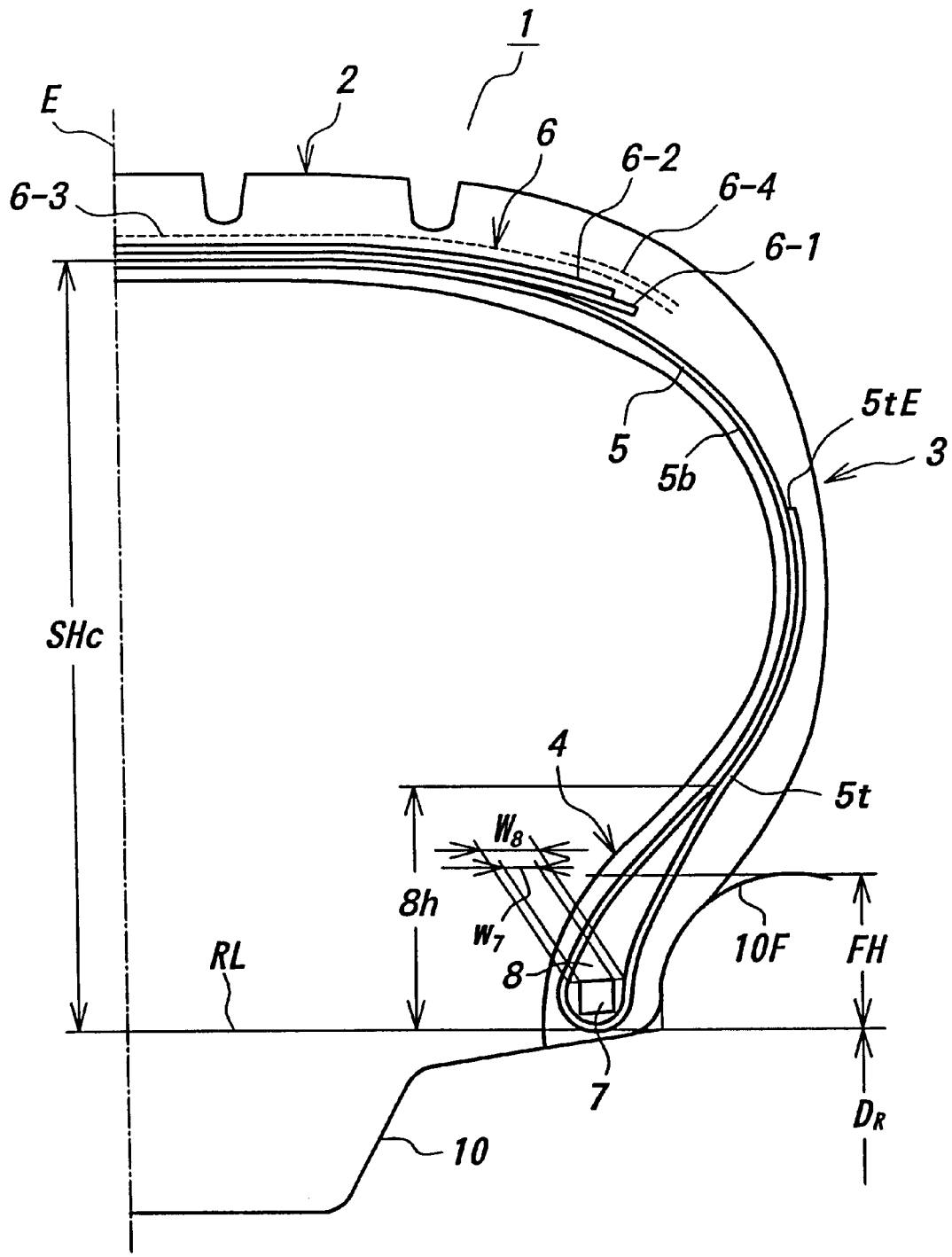
FIG. 3
CONVENTIONAL

PNEUMATIC TIRES WITH SIDEWALL REINFORCING LAYERS

BACKGROUND OF THE INVENTION

1. Field of the Invention

This invention relates to a pneumatic tire, and more particularly to a pneumatic radial tire for passenger cars, particularly front-wheel-drive passenger cars having excellent steering stability and ride comfort and a low noise property by largely reducing noise level based on tire cavity resonant sound.

2. Description of Related Art

In the pneumatic tire for passenger car (pneumatic radial tire), the steering stability becomes particularly important. In order to render this performance into a highly excellent level, it is common to apply a hard or super-hard bead filler rubber to a bead portion.

On the other hand, the application of such a bead filler rubber lowers the ride comfort and raises a noise level due to the tire cavity resonant sound. In order to render the steering stability, ride comfort and noise property of the tire into higher levels together, therefore, it is proposed to variously change height, material, shape and the like of the bead filler rubber in the tire.

If it is intended to improve the ride comfort, there is adopted a simple means for reducing the height of the bead filler rubber. In this case, however, the longitudinal rigidity in the radial direction of the tire lowers, while the circumferential and lateral rigidities of the tire simultaneously lower. Since these three rigidities are simultaneously decreased, the steering stability and the noise property based on the tire cavity resonant sound are simultaneously degraded. In other words, it is difficult to simultaneously establish the steering stability, ride comfort and noise property at higher levels.

SUMMARY OF THE INVENTION

It is, therefore, an object of the invention to provide a pneumatic tire having the steering stability, ride comfort and noise property at considerably higher levels.

According to the invention, there is the provision of a pneumatic tire comprising a tread portion, a pair of sidewall portions, a pair of bead portions, a carcass of one or more rubberized plies containing radially arranged cords therein and extending between a pair of bead cores embedded in the respective bead portion to reinforce these portions, a belt reinforcing the tread portion and a bead filler rubber taperingly extending between a main body and a turnup portion of the carcass outward from the bead core in a radial direction of the tire, wherein said bead filler rubber in an assembly of the tire and an approved rim has a height lower than a height of a rim flange, and the turnup portion of the carcass has a height corresponding to not less than 0.5 times a section height SHc of the carcass from a rim size line RL and extends over a maximum width position of the carcass and in parallel to the main body of the carcass outward from a taper end of the bead filler rubber, and a pair of sidewall reinforcing layers are arranged along an outside of the turnup portion so as to extend from a position near to the taper end of the bead filler rubber up to at least a position near to an end of the belt.

In this case, the term "approved rim" used herein means a rim described every the kind and size of the tire in JATMA YEAR BOOK 1999.

In a preferable embodiment of the invention, the bead filler rubber has a JIS A-hardness within a range of 50–150 and an inner edge of the bead filler rubber in the radial direction of the tire has a width corresponding to 1.0–1.5 times a maximum width of the bead core in a rotating axial direction of the tire.

In another preferable embodiment of the invention, the sidewall reinforcing layer has a thickness of 0.3–5.0 mm and a tensile modulus of 0.5–500 kgf/cm$^2$ in the circumferential direction of the tire.

In the other preferable embodiment of the invention, the sidewall reinforcing layer is made from a rubber composition having a tensile modulus of 0.5–50 kgf/cm$^2$.

In a further preferable embodiment of the invention, the sidewall reinforcing layer is made from a rubberized cord layer having a tensile modulus of 0.5–500 kgf/cm$^2$, and the rubberized cord layer contains organic fiber cords arranged at an inclination cord angle of not less than 0° with respect to a circumferential direction of the tire.

BRIEF DESCRIPTION OF THE DRAWINGS

The invention will be described with reference to the accompanying drawings, wherein:

FIG. 3 is a diagrammatically right-half section view of an assembly of the conventional tire with an approved rim.

DESCRIPTION OF PREFERRED EMBODIMENTS

Figure 1:
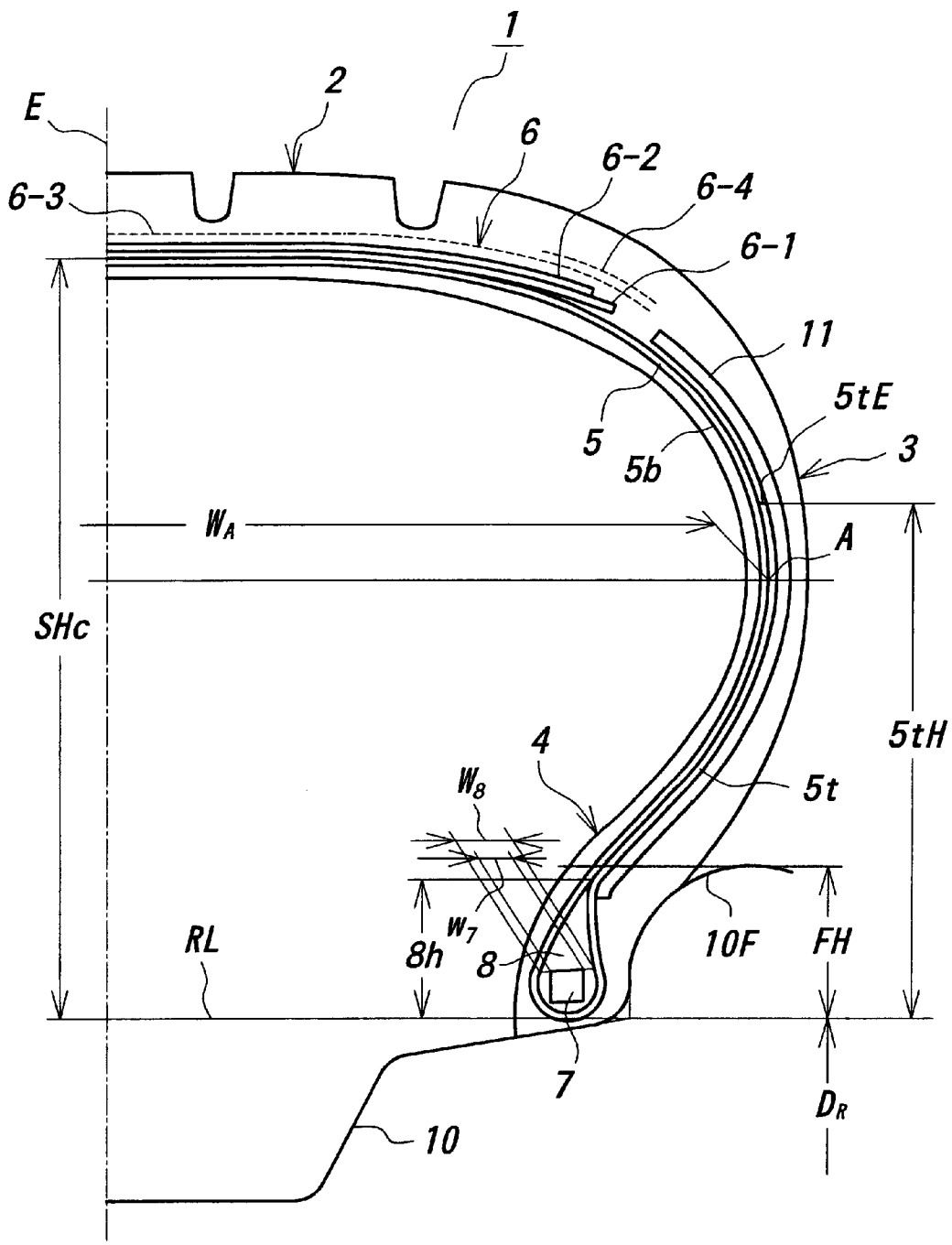
FIG. 1 is a diagrammatically right-half section view of an assembly of an embodiment of the pneumatic tire according to the invention with an approved rim.

In FIG. 1 is sectionally shown an assembly of an embodiment of the pneumatic tire according to the invention with an approved rim.

In FIG. 1, the pneumatic tire 1 comprises a tread portion 2, a pair of sidewall portions 3 connecting to both ends of the tread portion and a pair of bead portions 4 connecting thereto. And also, the tire 1 comprises a carcass 5 of at least one ply, one rubberized ply of radially arranged cords in the illustrated embodiment, and a belt 6. Moreover, the tire has the same structure on both sides with respect to an equatorial plane E of the tire.

The carcass 5 is extended between a pair of bead cores 7 embedded in the respective bead portions 4 to reinforce the tread portion 2, sidewall portions 3 and bead portions 4. And also, the carcass 5 is provided with a turnup portion 5t wound around the bead core 7 from an inside of the tire 1 toward an outside thereof in the radial direction. Therefore, a portion of the carcass 5 other than the turnup portion 5t is called as a main body 5b, if necessary.

The belt 6 is disposed on an outer periphery of the carcass 5 to reinforce the tread portion 2. In the illustrated embodiment, the belt 6 is comprised of two rubberized steel cord cross layers 6-1, 6-2, a cap layer 6-3 and a narrow-width layer 6-4. The cap layer 6-3 and narrow-width layer 6-4 are a rubberized layer of helically wound organic fiber cord, respectively.

And also, the tire 1 is provided with a bead filler rubber 8 extending between the main body 5b and the turnup portion 5t in the carcass 5 outward from an outer peripheral face of the bead core 7 in the radial direction of the tire.

In an assembly of the tire 1 with an approved rim 10, the bead filler rubber 8 has a height 8h (mm) lower than a height FH (mm) of a flange 10F of the rim 10. In this case, all of these heights are measured from a rim size line RL of a straight line passing through a rim diameter $D_R$ (mm) of the rim 10 in parallel to a rotating axial line (not shown) of the tire 1.

This assembly is at a self-posture state of the tire 1 fully fitted onto the rim 10, which is obtained by sufficiently filling a given internal pressure into the assembly and decreasing air pressure therefrom to such a low pressure that the tire 1 takes an adequate posture on the rim 10. Moreover, the rim 10 is shown by only an outer profile line.

The turnup portion 5t extends over a position A of a maximum width $W_A$ of the main body 5b of the carcass and has a height 5tH (mm) corresponding to not less than 0.5 times a section height SHc (mm) of the carcass 5. Furthermore, the turnup portion 5t extends in parallel to the main body 5b of the carcass outward from the taper end of the bead filler rubber 8 in the radial direction. In the illustrated embodiment, the turnup portion 5t extends close against the main body 5b of the carcass.

The tire 1 is provided with a pair of sidewall reinforcing layers 11 extending along the outside of the turnup portion 5t. An inward end of the sidewall reinforcing layer 11 in the radial direction of the tire is positioned near to the taper end of the bead filler rubber 8, while an outward end thereof is positioned near to at least an end portion of the belt 6.

In order to improve the ride comfort against vibrations of the vehicle and indoor noise, it is an effective means to reduce longitudinal rigidity in the radial direction of the tire. As such a means, it is effective to lower the height of the super-hard bead filler rubber 8, which was extended near to the position A of the maximum width $W_A$ of the carcass 5 in the conventional tire, up to the neighborhood of the height FH of the flange 10F of the rim 10 as shown in FIG. 1.

However, if the height of the bead filler rubber 8 is extremely lowered, the considerable decreases of the circumferential and lateral rigidities in the tire are caused in addition to the decrease of the longitudinal rigidity in the radial direction of the tire. These considerable decreases of the rigidities in the three directions degrade the steering stability of the tire and raise a level of tire cavity resonant sound (frequency zone of about 250 Hz) and hence the degradation of noise level in the inside of the vehicle is caused to degrade the ride comfort.

Particularly, the tire cavity resonant sound is dominated by secondary vibration mode in the radial direction of the tire. For this end, the considerable lowering of the height of the bead filler rubber 8 largely reduces the effect of controlling the secondary vibration mode, and hence the level of the tire cavity resonant sound is considerably raised to damage the noise property. And also, the tire having a considerably decreased circumferential rigidity causes a problem in the traction performance when it is used in a driving wheel of a front-wheel-drive vehicle.

In this connection, the height 8h of the super-hard bead filler rubber 8 in the tire 1 according to the invention is made not more than the height FH of the flange 10F of the rim 10, so that the longitudinal rigidity in the radial direction of the tire is reduced to improve the ride comfort.

On the other hand, the circumferential and lateral rigidities in the tire 1 can be raised by applying the sidewall reinforcing layer 11, whereby the steering stability can be maintained at a level equal to that of the conventional tire. And also, the secondary vibration mode in the radial direction of the tire 1 is suppressed by adding the sidewall reinforcing layer 11 to bring about the increase of mass, whereby the degradation of the level in the tire cavity resonant sound can be prevented to attain the noise reduction.

In fact, it is suitable to apply a rubber composition having a JIS A-hardness of 50–150 degrees to the bead filler rubber 8 for attaining the above effect. And also, the inner edge of the bead filler rubber 8 in the radial direction of the tire has a width $W_8$ corresponding to 1.0–1.5 times a maximum width $W_7$ of the bead core 7 in the rotating axial direction of the tire. In this way, the inner part of the bead portion 4 located near to the bead core 7 in the radial direction is strengthened, which contributes to improve the steering stability without damaging the ride comfort.

Furthermore, the sidewall reinforcing layer 11 has a thickness of 0.3–5.0 mm. When the thickness is less than 0.3 mm, the sufficient circumferential rigidity in the tire 1 can not be obtained, while when it exceeds 5.0 mm, the longitudinal rigidity in the radial direction of the tire 1 becomes too high and the desired good ride comfort can not be attained.

Moreover, the sidewall reinforcing layer 11 has such a property that the tensile modulus in the circumferential direction of the tire 1 is within a range of 0.5–500 kgf/cm². When the tensile modulus in the circumferential direction is less than 0.5 kgf/cm², the improvement of the steering stability is insufficient, while when it exceeds 500 kg/cm², the longitudinal rigidity in the radial direction of the tire 1 is undesirably increased.

As a material for the sidewall reinforcing layer 11 satisfying the tensile modulus in the circumferential direction of 0.5–500 kgf/cm², there are a case of using only a rubber composition and a case of using a rubberized cord layer.

In the rubber composition used for the sidewall reinforcing layer 11 the tensile modulus in the circumferential direction is within a range of 0.5–50 kgf/cm². In the rubberized cord layer used for the sidewall reinforcing layer 11, the tensile modulus in the circumferential direction is within a range of 200–500 kgf/cm². And also, the rubberized cord layer has an inclination cord angle of not less than 0° with respect to the circumferential direction of the tire. As the cord, organic fiber cords, particularly polyester cords are suitable.

The aforementioned tire 1 is favorable as a tire for passenger car, particularly a tire to be mounted onto a driving wheel of a front-wheel-drive passenger car.

The following examples are given in illustration of the invention and are not intended as limitations thereof.

Figure 2:
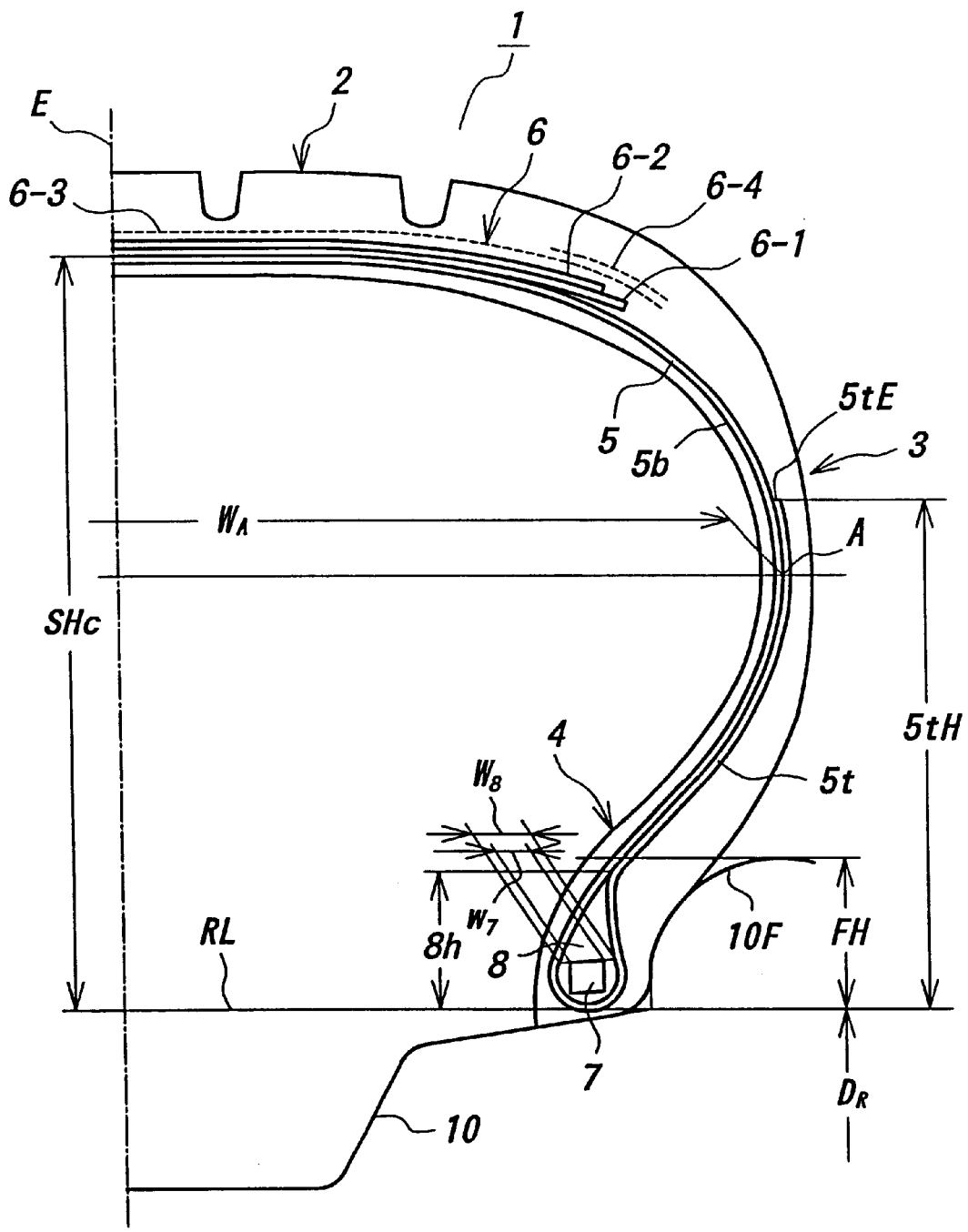
FIG. 2 is a diagrammatically right-half section view of an assembly of a comparative tire with an approved rim.

There are provided three radial ply tires for passenger car having a tire size of 195/65R15, wherein a first tire is an example tire having the structure shown in FIG. 1, a second tire is a comparative tire having the structure shown in FIG. 2, and a third tire is a conventional tire having the structure shown in FIG. 3. For convenience' sake, the same members as in FIG. 1 are represented by the same symbols in the assembly of the tire shown in FIGS. 2 or 3 with the rim.

With respect to these tires, the bead filler rubber 8 is used to have a JIS A-hardness of 97 degrees. The height 8h of the bead filler rubber 8 in each of the tires is shown as a difference (8h–FH) to the flange height FH of the rim 10 in Table 1, and also dimensions of the sidewall reinforcing layer 11 made only from the rubber composition in the example tire are shown in Table 1. All of these tires have the same structure other than those shown in Table 1.

Each of these tires is subjected to an actual running test on a test course using a front-wheel-drive passenger car. In this test are evaluated the steering stability, ride comfort and tire cavity resonant sound pressure level dB(A).

The steering stability and the ride comfort are represented by an index on the basis that the evaluation result of the conventional tire by a test driver is 100, respectively, and the tire cavity resonant sound level is shown by a sound pressure measured. With respect to these properties are simultaneously shown feelings of the test driver, respectively.

The results are also shown in Table 1.

TABLE 1

|  | Example | Comparative Example | Conventional Example |
|---|---|---|---|
| Height difference (8h-FH) (mm) | ±0 | ±0 | +25 |
| Ratio $W_8/W_7$ | 1.3 | 1.0 | 1.0 |
| Sidewall reinforcing layer 11 | presence | absence | absence |
| Material of sidewall reinforcing layer 11 | rubber composition | — | — |
| Tensile modulus of sidewall reinforcing layer 11 (kgf/cm$^2$) | 20 | — | — |
| Thickness of sidewall reinforcing layer 11 (mm) | 0.7 | — | — |
| Steering stability | 100 strong response, good balancing as a whole | 70 lowering of rigid feeling, distorting and wandering | 100 rigid feeling and strong response |
| Ride comfort | 110 soft hitting, mild ride comfort, good damping | 110 slight lowering of damping, soft feeling | 100 hard ride feeling, pushing shock, rugged feeling |
| Pressure level of tire cavity resonant sound dB (A) 250 Hz zone | 62.8 dB no notice of resonant sound | 64.1 dB notice of resonant sound | 62.9 dB no notice of resonant sound |

As seen from the results of Table 1, the example tire is excellent in at least one of the ride comfort, steering stability and sound pressure level as compared with the comparative tire and conventional tire and has a level simultaneously and highly improving these three properties.

As mentioned above, according to the invention, there can be provided pneumatic tires having excellent steering stability and ride comfort and a low noise property by largely reducing noise level based on tire cavity resonant sound.

What is claimed is:

1. A pneumatic tire comprising a tread portion, a pair of sidewall portions, a pair of bead portions, a carcass of one or more rubberized plies containing radially arranged cords therein and extending between a pair of bead cores embedded in the respective bead portion to reinforce these portions, a belt reinforcing the tread portion and a bead filler rubber taperingly extending between a main body and a turnup portion of the carcass outward from the bead core in a radial direction of the tire, wherein said bead filler rubber in an assembly of the tire and an approved rim has a height lower than a height of a rim flange, and the turnup portion of the carcass has a height corresponding to not less than 0.5 times a section height of the carcass from a rim size line and extends over a maximum width position of the carcass and in parallel to the main body of the carcass outward from a taper end of the bead filler rubber, and a pair of sidewall reinforcing layers are arranged along an outside of the turnup portion so as to extend from a position near to the taper end of the bead filler rubber up to at least a position near to an end of the belt.

2. A pneumatic tire according to claim 1, wherein the bead filler rubber has a JIS A-hardness within a range of 50–150 and an inner edge of the bead filler rubber in the radial direction of the tire has a width corresponding to 1.0–1.5 times a maximum width of the bead core in a rotating axial direction of the tire.

3. A pneumatic tire according to claim 1, wherein the sidewall reinforcing layer has a thickness of 0.3–5.0 mm and a tensile modulus of 0.5–500 kgf/cm$^2$ in the circumferential direction of the tire.

4. A pneumatic tire according to claim 1, wherein the sidewall reinforcing layer is made from a rubber composition having a tensile modulus of 0.5–50 kgf/cm$^2$.

5. A pneumatic tire according to claim 1, wherein the sidewall reinforcing layer is made from a rubberized cord layer having a tensile modulus of 0.5–500 kgf/cm$^2$, and the rubberized cord layer contains organic fiber cords arranged at an inclination cord angle of not less than 0° with respect to a circumferential direction of the tire.

* * * * *